US006998593B2

(12) United States Patent
Lee

(10) Patent No.: US 6,998,593 B2
(45) Date of Patent: Feb. 14, 2006

(54) MICROWAVE OVEN WITH INNER CONTAINER

(75) Inventor: Jang-Jun Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/443,890

(22) Filed: May 23, 2003

(65) Prior Publication Data

US 2004/0159656 A1 Aug. 19, 2004

(30) Foreign Application Priority Data

Feb. 7, 2003 (KR) ...................... 10-2003-0007737

(51) Int. Cl.
*H05B 6/80* (2006.01)
*H05B 6/78* (2006.01)
*A47J 37/04* (2006.01)

(52) U.S. Cl. ...................... 219/752; 219/755; 219/762; 219/732; 219/733; 99/421 R; 99/DIG. 14; 99/427

(58) Field of Classification Search ........ 219/752–755, 219/733, 732, 762; 99/421 H, 421 R, 427, 99/444, 445, 446, DIG. 14
See application file for complete search history.

(56) References Cited

U.S. PATENT DOCUMENTS

| | | | | |
|---|---|---|---|---|
| 3,215,338 | A * | 11/1965 | Schirmer | 99/441 |
| 4,409,452 | A * | 10/1983 | Oouchi et al. | 219/752 |
| 4,471,195 | A * | 9/1984 | Ishii et al. | 219/752 |
| 4,717,802 | A * | 1/1988 | Colato | 219/755 |
| 4,880,951 | A * | 11/1989 | Levinson | 219/733 |
| 5,057,331 | A * | 10/1991 | Levinson | 426/243 |
| 6,220,152 | B1 * | 4/2001 | Baldwin et al. | 99/427 |

OTHER PUBLICATIONS

Kim, Spit Device for Barbecue in Microwave Oven, Pub. Date Jul. 10, 2000, Korean Patent Abstract, Pub. No. 02-67932.

* cited by examiner

*Primary Examiner*—Philip H. Leung
(74) *Attorney, Agent, or Firm*—Staas & Halsey LLP

(57) ABSTRACT

A microwave oven includes a cooking cavity, a skewer which receives food therethrough to hold the food, and a container which contains the food therein so as to prevent oil produced from the food from being adhered to an inner wall of the cooking cavity. Accordingly, the oil generated from the food is not spattered onto the inner wall, and is allowed to collect in an oil collecting tray of the microwave oven through one or more holes of the container.

28 Claims, 4 Drawing Sheets

MICROWAVE OVEN WITH INNER CONTAINER

CROSS-REFERENCE TO RELATED APPLICATIONS

This application claims the benefit of Korean Patent Application No. 2003-7737, filed Feb. 07, 2003, in the Korean Intellectual Property Office, the disclosure of which is incorporated herein by reference.

BACKGROUND OF THE INVENTION

1. Field of the Invention

The present invention relates to microwave ovens, and more particularly, to a microwave oven which barbecues food.

2. Description of the Related Art

Generally, with a conventional microwave oven, food is barbecue cooked by skewering the food on a skewer, placing the skewered food in a cooking cavity of the microwave oven, placing an oil collecting tray on a bottom of the cooking cavity, and starting a barbecue operation of the microwave oven. In this case, a motor connected to the skewer is operated to rotate the food skewered on the skewer, and the food is barbecued by microwaves irradiated from a magnetron and/or heat generated from a heater of the microwave oven.

However, where the food skewered on the skewer is barbecued, a portion of oil produced from the food does not drop to the oil collecting tray. Rather, it is splattered on an inner wall of the cooking cavity due to the heat generated from the heater or the microwaves. In this case, the inner wall of the cooking cavity, as well as brackets which hold the skewer, is stained with the oil that is later hardened. Thus, it is difficult and time consuming to clean the interior of the cooking cavity to remove the oil after a cooking operation thereof. Furthermore, since the hardened oil is more difficult to remove/clean, the interior of the cooking must be cleaned soon after the cooking operation and more frequently cleaned, thereby inconveniencing a user.

SUMMARY OF THE INVENTION

Accordingly, it is an aspect of the present invention to provide a microwave oven which is designed to prevent oil produced from food from being spattered on an inner wall of a cooking cavity, thus allowing a clean surface of the inner wall to be easily maintained.

Additional aspects and advantages of the invention will be set forth in part in the description which follows and, in part, will be obvious from the description, or may be learned by practice of the invention.

To achieve the above and/or other aspects of the present invention, there is provided a microwave oven comprising a cooking cavity, a skewer which is inserted through the food and holds the food, and a container which contains the food therein so as not to stain an inner wall of the cooking cavity with oil produced from the food during a cooking operation of the microwave oven.

The container may include an oil drain hole which is provided at a predetermined portion of the container so as to discharge the oil to an outside of the container through the oil drain hole.

The microwave oven may further comprise an oil collecting tray which collects the oil discharged from the container.

The microwave oven may further comprise a motor which rotates the food, wherein the container is rotated by an operation of the motor.

The container may include first and second casings, each being opened at a side thereof to surround the food, and assembled with each other to form the container.

The first and second casings may include first and second holes which are formed at predetermined portions of the first and second casings of the container, respectively, and a bolt which is tightened into the first and second holes so as to assemble the first and second casings with each other.

The first casing may further include an internal thread which is provided along an edge of the open side of the first casing, and the second casing may further include an external thread which is provided along an edge of the open side of the second casing and engages with the internal thread of the first casing to assemble the first and second casings with each other.

To achieve the above and/or other aspects of the present invention, thee is provided another microwave oven comprising an inner casing which defines a cooking cavity of the microwave oven, a heating unit which heats and cooks food, a skewer which is inserted through the food and holds the food, and a container which contains the food therein so as not to stain the inner casing with oil produced from the food while cooking the food using the heating unit.

The microwave oven may further comprise a motor which rotates the food, wherein the container is rotated along with the skewer by an operation of the motor, and an oil collecting tray which collects the oil discharged from the container, wherein the container includes an oil drain hole that discharges the oil therethrough.

The heating unit may include at least one of a heater which generates heat and a magnetron which generates microwaves.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
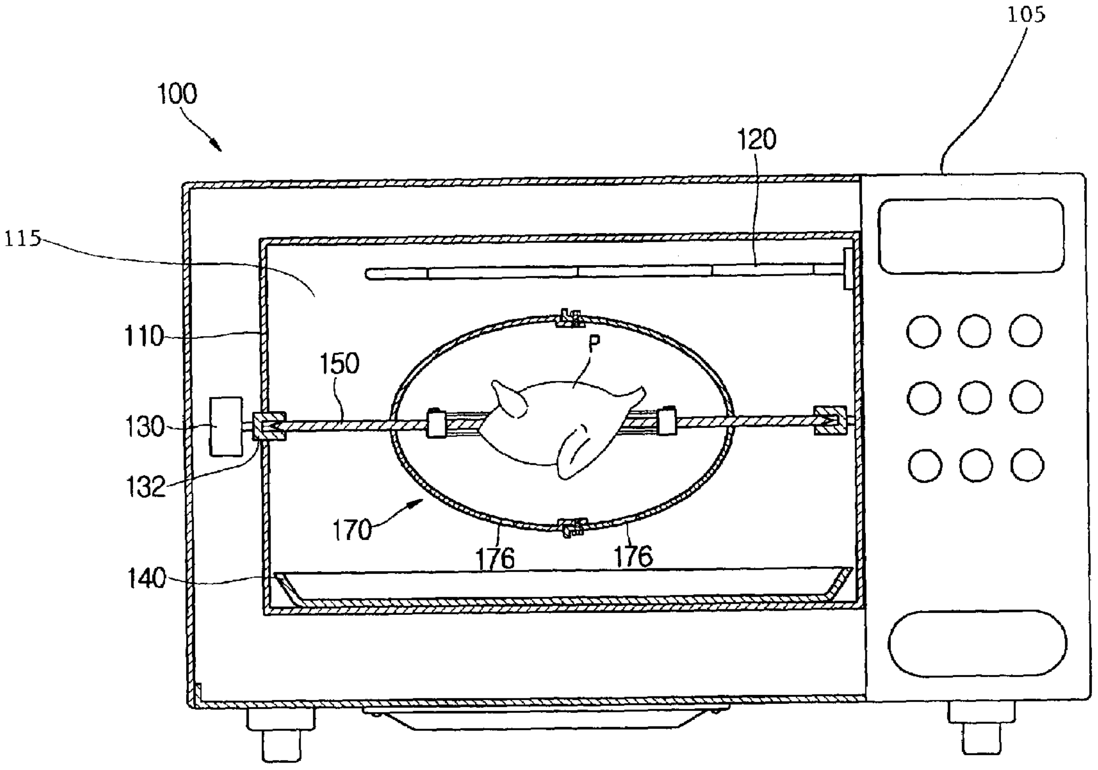
FIG. 1 is a sectional view of a microwave oven according to an embodiment of the present invention.

Reference will now be made in detail to the present preferred embodiments of the present invention, examples of which are illustrated in the accompanying drawings, wherein like reference numerals refer to like elements throughout.

FIG. 1 shows a sectional view of a microwave oven according to an embodiment of the present invention. As shown in FIG. 1, the microwave oven 100 includes an inner casing 110 which defines a cooking cavity 115 provided in a cabinet 105 of the microwave oven. A heater 120 is mounted to an upper portion of the cooking cavity 115 defined by the inner casing 110 to generate heat. Two brackets 132 are mounted to respective sidewalls of the inner casing 110 to support a main skewer 150, which is inserted through food P to hold the food P. A motor 130 is connected at its motor shaft to one of the brackets 132. By an operation of the motor 130, the food P skewered on the main skewer 150 is rotated. An oil collecting tray 140 is seated on a lower portion of the cooking cavity 115 to collect oil produced from the food P.

The microwave oven 100 further includes a container 170. The container 170 is provided at a position between the heater 120 and the oil collecting tray 140, and contains the food P therein. Several oil drain holes 176 are formed on the container 170 to discharge the oil produced from the food P to the outside of the container 170. The oil discharged through the oil drain holes 176 drops to the oil collecting tray 140.

Figure 2:
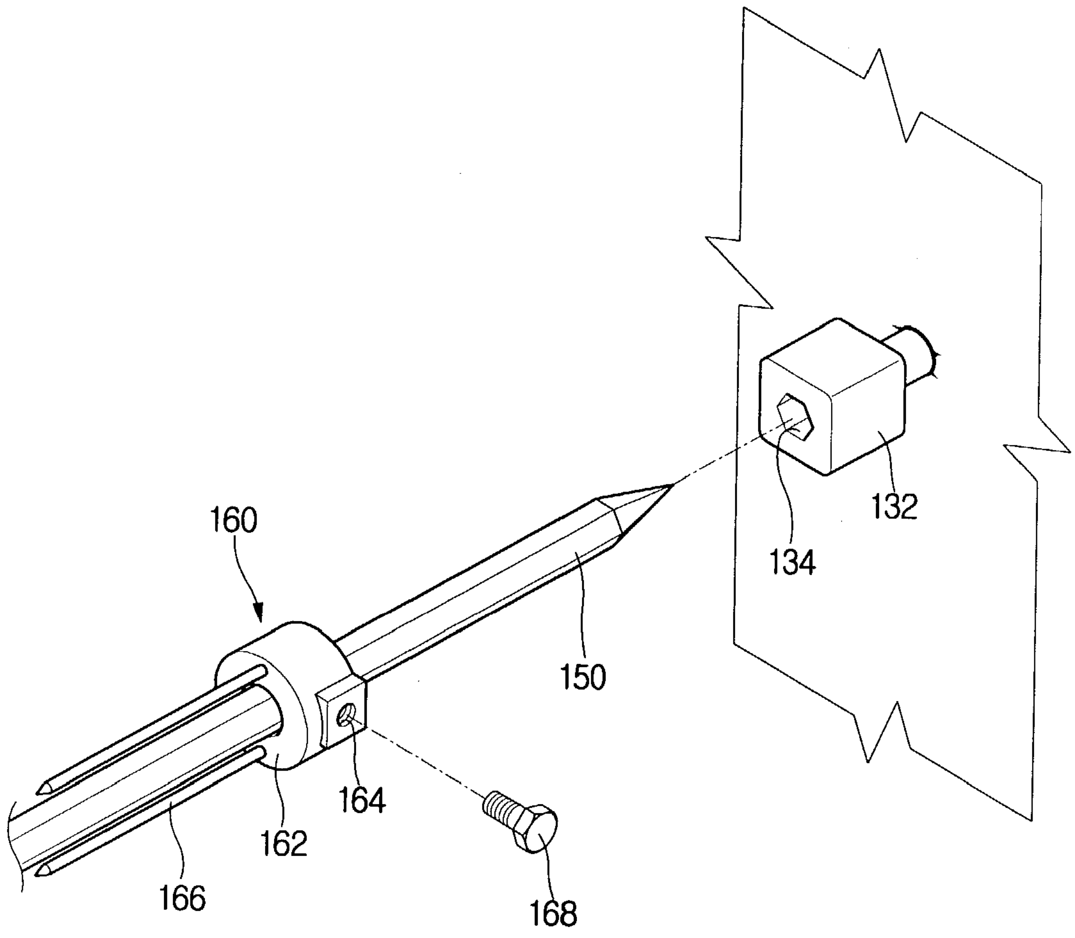
FIG. 2 is a partial perspective view of a skewer, which is inserted through food, utilized in the microwave oven shown in FIG. 1.

FIG. 2 shows a sub-skewer 160 of the microwave oven shown in FIG. 1. The sub-skewer 160 prevents the main skewer 150 from being idly rotated. The sub-skewer 160 has a body 162 with a screw hole 164 and one or more needles 166. The body 162 is fitted over the main skewer 150. The screw hole 164 is formed at a predetermined portion of the body 162. The needles 166 are pointed at their respective front ends. A bolt 168 is tightened into the screw hole 164 to fasten the body 162 of the sub-skewer 160 to the main skewer 150.

The main skewer 150 is inserted at an end thereof into a hole 134 which is formed at a side of each bracket 132. Where the motor 130 connected to one of the brackets 132 is operated, the bracket 132 is rotated to rotate the main skewer 150.

Figure 3:
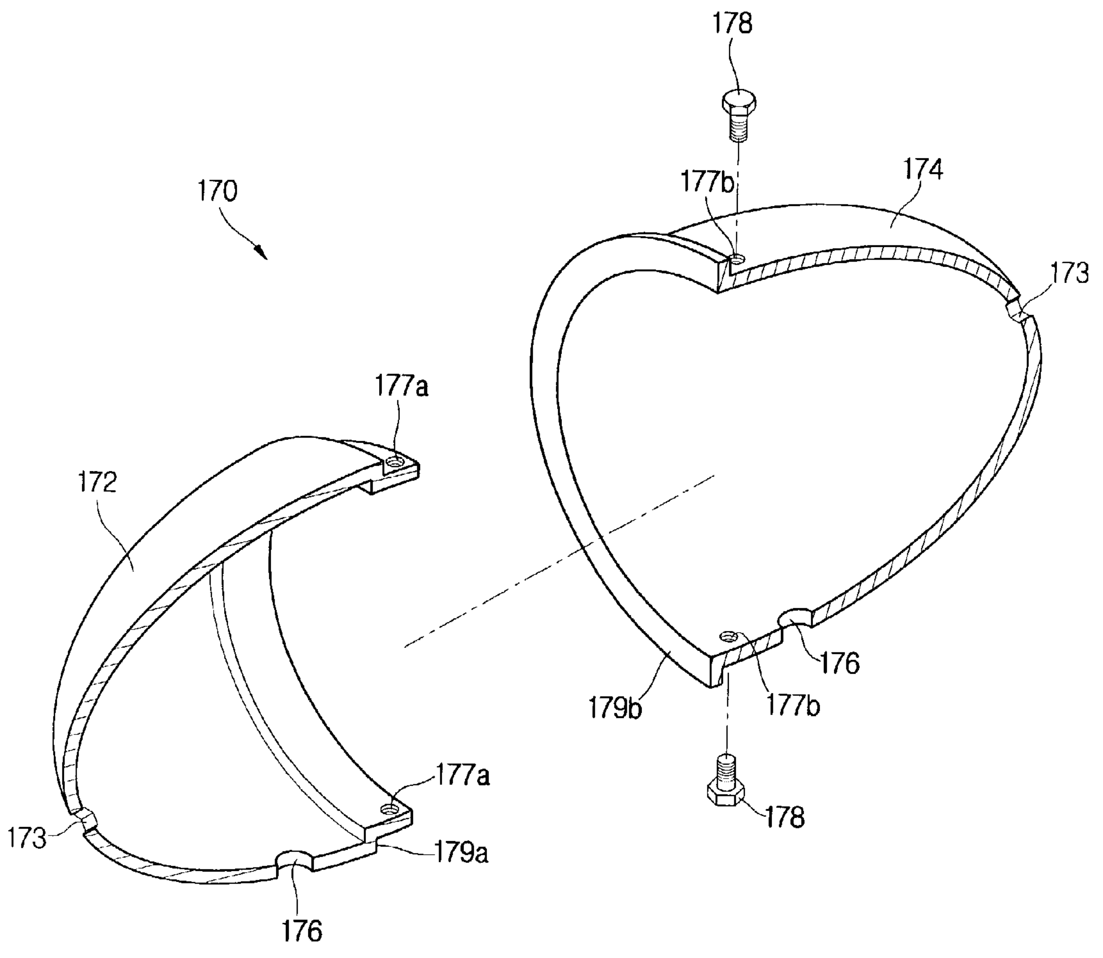
FIG. 3 is an exploded perspective view of a container of the microwave oven shown in FIG. 1.

FIG. 3 shows the container 170 of the microwave shown in FIG. 1. The container 170 is provided with first and second casings 172 and 174 to receive the food P therein. A through hole 173 is provided at each of the first and second casings 172 and 174. The main skewer 150 passes through the container 170 through the through holes 173.

As shown in FIG. 3, an oil drain hole 176 is provided at each of the first and second casings 172 and 174 to discharge oil produced from the food P, during a cooking operation, to the outside of the container 170.

The first and second casings 172 and 174 each have an oval hemispherical shape, and are assembled with each other to form the container 170. That is, the first casing 172 is stepped inward along an edge of an open side thereof to form a first bent part 179*a*. The second casing 174 is bent outward along an edge of an open side thereof to form a second bent part 179*b*. The first and second casings 172 and 174 are arranged in such a way that the first bent part 179*a* of the first casing 172 is in contact with the second bent part 179*b* of the second casing 174 while a hole 177*a* of the first casing 172 is aligned with a hole 177*b* of the second casing 174. Thereafter, the first and second casings 172 and 174 are assembled with each other by a bolt 178 tightened into the holes 177*a* and 177*b*.

Figure 4:
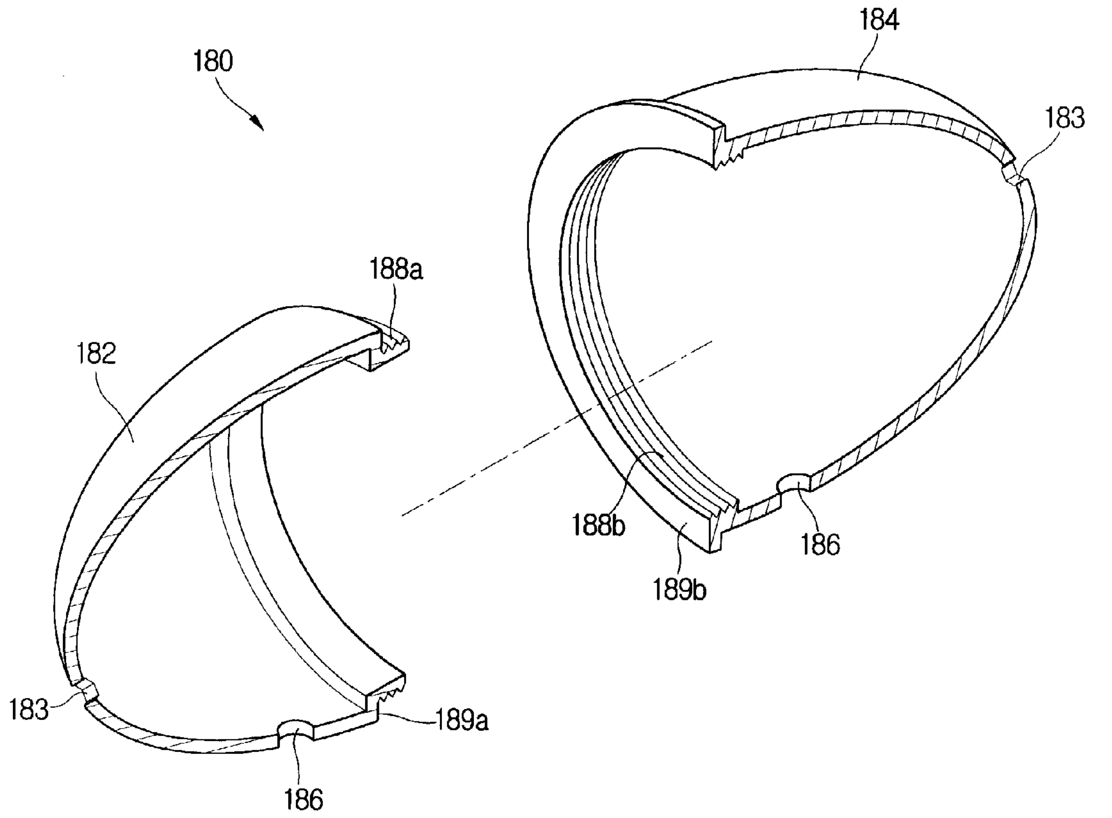
FIG. 4 is an exploded perspective view of a container of a microwave oven according to another embodiment of the present invention.

FIG. 4 shows a container 180 of a microwave oven according to another embodiment of the present invention. The container 180 is provided with first and second casings 182 and 184 to receive food (not shown) therein. A through hole 183 is provided at each of the first and second casings 182 and 184. For example, a main skewer 150 shown in FIG. 1 may pass through the container 180 through the through holes 183.

An oil drain hole 186 is provided at each of the first and second casings 182 and 184 to discharge oil produced from the food, during a cooking operation, to the outside of the container 180.

The first and second casings 182 and 184 each have an oval hemispherical shape. An external thread 188*a* is provided along an outer surface of a first bent part 189*a* which is stepped inward at an open side of the first casing 182. An internal thread 188*b* is provided along an inner surface of a second bent part 189*b* which is bent outward along an edge of an open side of the second casing 184. The external thread 188*a* of the first casing 182 engages with the internal thread 188*b* of the second casing 184 to assemble the first and second casings 182 and 184 with each other.

An operation of a microwave oven according to the present invention will be described below with reference to the drawings.

The food P is skewered on the main skewer 150. Two sub-skewers 160 are fitted over both sides of the main skewer 150, respectively, to prevent the main skewer 150 from being idly rotated. In this case, the needles 166 of each sub-skewer 160 is inserted through the food P. Subsequently, the body 162 of each sub-skewer 160 is fastened to the main skewer 150 using the bolt 168. Afterwards, the first and second casings 172 and 174 of the container 170, or the first and second casings 182 and 184 of the container 180 are installed on the main skewer 150 to receive the food P in the container 170 or 180. In this case, the first and second casings 172 and 174, or 182 and 184 are assembled with each other to form the container 170 or 180. Thereafter, both ends of the main skewer 150 are inserted into the respective brackets 132.

Where a barbecue cooking mode is set, the heater 120 and/or the magnetron (not shown) is operated to generate heat and/or microwaves. A cooking operation thereof is carried out using the heat and/or the microwaves while the motor 130 is rotated. The brackets 132 are rotated by the operation of the motor 130. Accordingly, the main skewer 150, which is inserted into the brackets 132, the food P, and the container 170 or 180 are simultaneously rotated.

As the food P is cooked, oil, produced from the food P due to the heat generated from the heater 120 or the microwaves irradiated from the magnetron, is discharged through the oil drain holes 176 or 186. The oil, discharged through the oil drain holes 176 or 186, drops to the oil collecting tray 140.

As described above, the present invention provides a microwave oven having a container which contains food therein, and prevents oil produced from the food, during for example, a barbecuing operation, from being spattered on a cooking cavity of the microwave oven. Additionally, the microwave oven is provided so as to easily remove the container from the microwave oven where the barbecuing operation is completed. Accordingly, an interior of the cooking cavity is more easily cleaned, as compared to a conventional microwave oven.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A microwave oven to cook food, comprising:

a cooking cavity;

a skewer which is inserted through the food and holds the food; and a container which contains the food therein so as not to stain an inner wall of the cooking cavity with oil produced from the food during a cooking operation of the microwave oven, the container having first and second casings to be assembled with each other along the skewer and in the axial direction thereof, wherein the first and second casings each comprise:

a first side which is open to thereby surround the food, the first sides of the first and second casings being adjacent each other, and a second side having a diameter smaller than a diameter of the respective first side, the second sides being at opposite ends of the container.

2. The microwave oven according to claim 1, wherein the container includes an oil drain hole which is provided at a predetermined portion of the container so as to discharge the oil to an outside of the container through the oil drain hole.

3. The microwave oven according to claim 2, further comprising an oil collecting tray which collects the oil discharged from the container.

4. The microwave oven according to claim 1, further comprising a motor which rotates the food, wherein the container is rotated by an operation of the motor.

5. The microwave oven according to claim 4, further comprising one or more brackets which support the skewer, wherein the motor is connected to one of the brackets and rotates the container along with the skewer.

6. The microwave oven according to claim 5, wherein the skewer includes:

a main skewer having ends corresponding to respective openings of the brackets; and one or more sub-skewers which are inserted through the food and prevent the main skewer from being idly rotated.

7. The microwave oven according to claim 6, wherein the each of the sub-skewers includes:

a body having one or more protruding needles that are inserted through the food; and a securing unit which fastens the body to the main skewer.

8. The microwave oven according to claim 1, wherein the first and second casings include:

first and second holes which are formed at predetermined portions of the first and second casings of the container, respectively; and a bolt which is tightened into the first and second holes so as to assemble the first and second casings with each other.

9. The microwave oven according to claim 1, wherein:

the first casing includes an internal thread which is provided along an edge of the first side of the first casing, and the second casing includes an external thread which is provided along an edge of the first side of the second casing and engages with the internal thread of the first casing to assemble the first and second casings with each other.

10. The microwave oven according to claim 1, further comprising a heating unit which includes a magnetron that generates microwaves to cook the food.

11. The microwave oven according to claim 10, wherein the heating unit further includes a heater which provides heat to cook the food.

12. The microwave oven according to claim 10, wherein the food is rotated along with the skewer during an operation of the heating unit.

13. The microwave oven according to claim 1, wherein the container is removably provided in the cooking cavity.

14. The microwave oven according to claim 1, wherein the first and second casing include corresponding through holes which allow the main skewer to pass therethrough.

15. A microwave oven comprising:

an inner casing which defines a cooking cavity;

a heating unit which heats and cooks food;

a skewer which is inserted through the food and holds the food; and a container which contains the food therein so as not to stain the inner casing with oil produced from the food while cooking the food using the heating unit, the container having first and second casings to be assembled with each other along the skewer and in the axial direction thereof, wherein the first and second casings each comprise:

a first side which is open to thereby surround the food, the first sides of the first and second casings being adjacent each other, and a second side having a diameter smaller than a diameter of the respective first side, the second sides being at opposite ends of the container.

16. The microwave oven according to claim 15, further comprising:

a motor which rotates the food, wherein the container is rotated along with the skewer-by an operation of the motor; and an oil collecting tray which collects the oil discharged from the container, wherein the container includes an oil drain hole that discharges the oil therethrough.

17. The microwave oven according to claim 15, wherein the heating unit includes at least one of a heater which generates heat and a magnetron which generates microwaves.

18. The microwave oven according to claim 15, wherein the container is removably provided in the cooking cavity.

19. The microwave oven according to claim 15, wherein the first casing is stepped inward along an edge of the first side thereof to form a first bent part, the second casing is bent outward along an edge of the first side thereof to form a second bent part, and the first and second casings are arranged so that the first bent part is in contact with the second bent part.

20. A cooking apparatus to cook food, comprising:

a first cooking chamber;

a heating unit to cook the food;

a skewer which is inserted through the food and holds the food;

a motor which rotates the food along with the skewer; and a second cooking chamber which is removably provided in the first cooking chamber to contain the food therein so as not to stain an inner wall of the first cooking chamber with oil produced from the food while cooking the food using the heating unit, the second chamber having first and second casings to be assembled with each other along the skewer and in the axial direction thereof, wherein the first and second casings each comprise:

a first side which is open to thereby surround the food, the sides of the first and second casings being adjacent each other, and a second side having a diameter smaller than a diameter of the respective first side, the second sides being at opposite ends of the second cooking chamber.

21. The cooking apparatus according to claim 20, wherein the heating unit includes at least one of a heater which generates heat and a magnetron which generates microwaves.

22. A cooking apparatus to cook food, which has been skewered on a skewer, comprising:

a cooking chamber;

a heating unit which cooks the food;

a container which collects oil produced from the food; and a casing which contains the food and directs the oil produced from the food to the container, the casing having first and second casing portions to be assembled with each other along the skewer and in the axial direction thereof, wherein the first and second casing portions each comprise:

a first side which is open to thereby surround the food, the sides of the first and second casing portions being adjacent each other, and a second side having a diameter smaller than a diameter of the respective first side, the second sides being at opposite ends of the container.

23. The cooking apparatus according to claim 22, wherein the heating unit includes at least one of a heater which generates heat and a magnetron which generates microwaves.

24. The cooking apparatus according to claim 22, wherein the casing includes one or more channeling holes that direct the oil to the container.

25. The cooking apparatus according to claim 22, wherein the casing surrounds the food and directs the oil to the container so as to prevent splattering of the oil on an inner wall of the cooking chamber.

26. The cooking apparatus according to claim 22, wherein the container and the casing are removably provided in the cooking chamber.

27. The cooking apparatus according to claim 22, further comprising a rotating unit which rotates the food along with the casing.

28. The cooking apparatus according to claim 27, wherein the rotating unit includes a skewer that is inserted through the food and holds the food.

* * * * *

UNITED STATES PATENT AND TRADEMARK OFFICE

CERTIFICATE OF CORRECTION

PATENT NO. : 6,998,593 B2

APPLICATION NO. : 10/443890

DATED : February 14, 2006

INVENTOR(S) : Jang-Jun Lee

It is certified that error appears in the above-identified patent and that said Letters Patent is hereby corrected as shown below:

Column 6, line 26, change “skewer-by” to --skewer by--

Signed and Sealed this

First Day of August, 2006

JON W. DUDAS

*Director of the United States Patent and Trademark Office*